H. H. LUECK.
PLANTER.
APPLICATION FILED NOV. 29, 1910.
996,867.
Patented July 4, 1911.
2 SHEETS—SHEET 2.
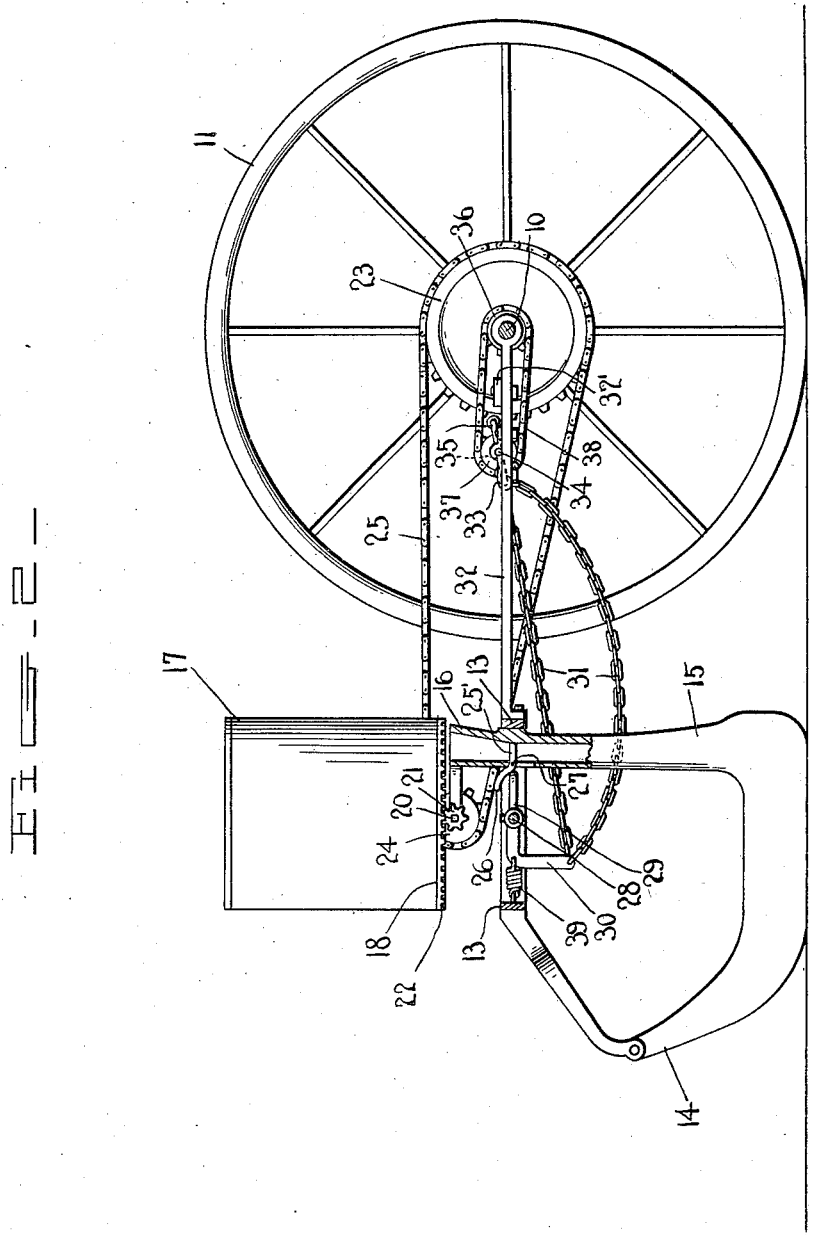
Witnesses
L. B. James
Francis Boyle
Inventor
Henry H. Lueck
By
Attorneys

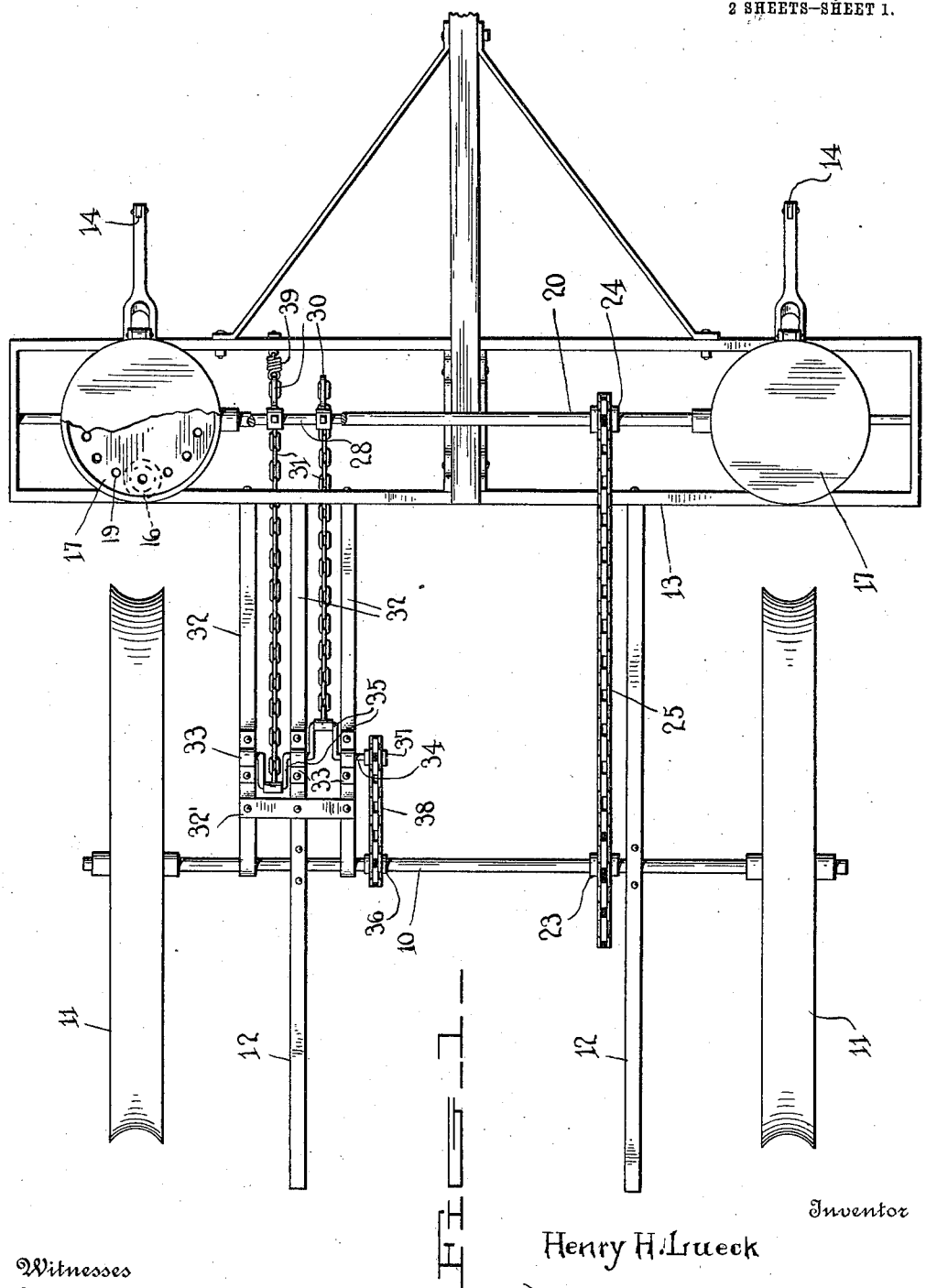

UNITED STATES PATENT OFFICE.

HENRY H. LUECK, OF DOW CITY, IOWA.

PLANTER.

996,867.　　　　Specification of Letters Patent.　　Patented July 4, 1911.

Application filed November 29, 1910. Serial No. 594,747.

*To all whom it may concern:*

Be it known that I, HENRY H. LUECK, a citizen of the United States, residing at Dow City, in the county of Crawford, State of Iowa, have invented certain new and useful Improvements in Planters; and I do hereby declare the following to be a full, clear, and exact description of the invention, such as will enable others skilled in the art to which it appertains to make and use the same.

This invention relates to planters more particularly to means for operating the seed dropping mechanism of planters.

The present invention contemplates providing a flexible device that will operate to trip the valve in the seed delivery tube a predetermined number of times during each revolution of the planter ground wheels in order to regulate the discharge of seed, this improved power transmission device being applicable to most of the ordinary planters now in use and without requiring alterations to be made in the planter construction and still further when in applied position occupying a minimum amount of space.

With the above objects in view the invention consists of the novel details of construction and combination of parts hereinafter fully described and claimed, it being understood that modifications may be made in the minor details of construction within the scope of the appended claim.

In the accompanying drawing forming part of this specification, Figure 1 is a plan view with the planter equipped with my improved device, Fig. 2 is a side elevation of the planter with portions removed.

Referring now to the drawing in which like characters of reference designate similar parts in the views shown, 10 designates an axle the opposite ends of which are equipped with ground wheels 11, a pair of horizontal sills 12 projecting longitudinally across the axle and carrying at their outer ends a transversely disposed skeleton frame 13. On each end of the transverse frame is a shoe or furrow opener 14 the heel 15 of which is hollow and forms a seed discharge tube. The discharge tubes 15 extend considerably above the transverse frame as shown at 16 and communicate at their upper ends with hoppers 17, each hopper being equipped internally with the usual rotary disk bottom 18 having perforations 19 formed therein which register with the seed delivery tube at certain positions in the rotation of the disk bottom and permit of seed dropping into the tube.

For rotating the disk bottoms, a shaft 20 is mounted in the frame 13 and extends transversely across the bottom of the seed hoppers, this shaft being equipped at its outer ends with pinions 21 which mesh with peripheral teeth 22 formed on the rotary disk bottoms. Sprocket gears 23 and 24 fixed to the axle 10 and shaft 20 respectively, and over which a link chain 25 is trained, form means for rotating the shaft.

Arranged in the bore of each seed delivery tube 15 is a plate valve 25' one end of which is reduced to form a stem 26 which projects through the forward face of the shoe and is pivoted as shown at 27 to the shoe. The stem forms a means for tripping the valve and permitting of the accumulation of seed thereon gravitating and being discharged through the delivery tube.

It is now clear from the above description that as the seed gravitates from the hoppers into the delivery tubes and accumulates on the valves in the delivery tubes, that the amount of seed discharged will be regulated by the number of times the valves are tripped during each revolution of the ground wheels. It is for tripping these valves a predetermined number of times, say twice during each revolution of the ground wheels that the hereinafter described tripping mechanism comprising the subject matter of this invention is provided.

Arranged longitudinally of the transverse frame is a rock shaft 28, and fixed to this rock shaft are a pair of trip fingers 29 which bear upon the bottom faces of the valve stems 26. Fixed to the shaft are a pair of angle irons 30, these angle irons performing the function of cranks for rocking the shaft. A link chain 31 is fixed at its forward end to each crank, and forms means for pulling rearwardly the cranks in alternation, each crank while rocking serving to rock the fingers 29 and trip the valves in both delivery tubes.

Fixed to the axle 10 and transverse frame 13 is a plurality of sills 32, these sills extending longitudinally of the planter and being rigidly held in position by a cross brace 32'. Mounted on the top faces of the sills is a series of alined journal boxes 33 and a shaft 34 is journaled at its opposite ends in the outermost journal boxes of the series, this shaft being bent between each pair of sills to form cranks 35, all the cranks extending in the same plane and each crank projecting from an opposite side of the shaft than the next adjacent crank. To each crank is connected the rear end of one of the chains 31. It is now clear that during each revolution of the axle 10, each crank of the series will make a complete revolution and operate through the instrumentality of its chain 31, angle iron lever 30 and trip finger 29 to trip the valve in the delivery tube. It will further be noted that since the two cranks here illustrated are arranged in the same plane and project on opposite sides of the shaft 34, that when one of the cranks is in its operative position and is tripping the valve, the other crank will be in released position and will come into its operative position as the first named crank moves to released position so that twice during a revolution of the shaft 34 will the valves be tripped.

For actuating the crank shaft 34 at the same rate of speed as the axle 10, a sprocket gear 36 is fixed to the axle, and a sprocket gear 37 with the same number of teeth fixed to the crank shaft 34. An endless link chain 38 is trained over these sprocket gears. It will now be noted that during each complete revolution of the ground wheels that the crank shaft 34 will make a complete revolution and through the instrumentality of the pair of cranks will trip the said valves twice.

As herein illustrated the valves are tripped twice during each revolution of the ground wheels but it is clear that should a greater number of trips be desired, that the crank shaft actuating gear 36 may be removed and replaced with a larger gear without departing from the spirit of the invention or sacrificing any of the advantages thereof.

For moving the angle iron levers to their released position after each actuation, a helical spring 39 is fixed at its opposite extremities to one of the levers and to the adjacent side of the transverse frame 13. This spring stores up energy as the levers are actuated through the instrumentality of the draw chains to return the levers to their released position upon the release of the draw chains.

What is claimed, is:—

The combination with a planter having an axle, a seed hopper, a seed delivery tube, and a valve in said tube, of a rock shaft arranged adjacent to said valve, and having a finger for tripping said valve, an angular lever fixed to said rock shaft, a crank shaft arranged adjacent to said axle and actuated thereby, a flexible connector between said crank shaft and angle iron lever and operating to actuate said lever whereby to rock said rock shaft, and a tension means operating to return said angle iron lever to released position after each actuation.

In testimony whereof, I affix my signature, in presence of two witnesses.

HENRY H. LUECK.

Witnesses:
P. D. McMahon,
J. W. Miller, Jr.

---

Copies of this patent may be obtained for five cents each, by addressing the "Commissioner of Patents, Washington, D. C."